(12) United States Patent
Abrams et al.

(10) Patent No.: US 10,737,258 B2
(45) Date of Patent: Aug. 11, 2020

(54) HONEYCOMB CATALYST FOR REMOVAL OF NITROGEN OXIDES IN FLUE AND EXHAUST GASSES AND METHOD OF PREPARATION THEREOF

(71) Applicant: UMICORE AG & CO. KG, Hanau-Wolfgang (DE)

(72) Inventors: Billie Lynn Abrams, Allerød (DK); Francesco Castellino, Birkerød (DK)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 64 days.

(21) Appl. No.: 15/754,748

(22) PCT Filed: Oct. 26, 2016

(86) PCT No.: PCT/EP2016/075722
§ 371 (c)(1),
(2) Date: Feb. 23, 2018

(87) PCT Pub. No.: WO2017/072137
PCT Pub. Date: May 4, 2017

(65) Prior Publication Data
US 2018/0243733 A1 Aug. 30, 2018

(30) Foreign Application Priority Data
Oct. 28, 2015 (DK) .................. 2015 00661

(51) Int. Cl.
*B01J 23/22* (2006.01)
*B01J 23/30* (2006.01)
(Continued)

(52) U.S. Cl.
CPC .......... *B01J 35/04* (2013.01); *B01D 53/8628* (2013.01); *B01D 53/9418* (2013.01); *B01J 23/22* (2013.01);
(Continued)

(58) Field of Classification Search
CPC . B01J 23/22; B01J 23/30; B01J 21/063; B01J 21/08; B01J 21/16; B01J 35/04;
(Continued)

(56) References Cited

U.S. PATENT DOCUMENTS 3,104,194 A * 9/1963 Zahorski ............... E04C 2/34
428/116
4,416,800 A 11/1983 Abe et al.
(Continued)

FOREIGN PATENT DOCUMENTS

EP 11524024 B1 2/2010

OTHER PUBLICATIONS

International Search Report for PCT/EP2016/075722, dated Jan. 5, 2017 in English Language.
(Continued)

*Primary Examiner* — Cam N. Nguyen
(74) *Attorney, Agent, or Firm* — Smith, Gambrell & Russell, LLP

(57) ABSTRACT

A vanadium oxide based honeycomb SCR catalyst composed of a plurality of corrugated sheets stacked upon one another to form a plurality of flow through channels, the corrugated sheets are provided with an inert inner core layer and an outermost layer containing a SCR catalyst composition.

21 Claims, 1 Drawing Sheet

(51) Int. Cl.
*B01J 21/06* (2006.01)
*B01J 21/08* (2006.01)
*B01J 21/16* (2006.01)
*B01J 35/04* (2006.01)
*B01J 35/06* (2006.01)
*B01J 37/02* (2006.01)
*B01D 53/86* (2006.01)
*B01D 53/94* (2006.01)

(52) U.S. Cl.
CPC .............. *B01J 23/30* (2013.01); *B01J 35/06* (2013.01); *B01J 37/0215* (2013.01); *B01J 37/0236* (2013.01); *B01J 37/0244* (2013.01); *B01D 2255/20707* (2013.01); *B01D 2255/20723* (2013.01); *B01D 2255/9022* (2013.01); *B01D 2255/9202* (2013.01)

(58) Field of Classification Search
CPC .... B01J 35/06; B01J 37/0215; B01J 37/0236; B01J 37/0244
See application file for complete search history.

(56) References Cited

U.S. PATENT DOCUMENTS

| | | | | |
|---|---|---|---|---|
| 4,988,483 | A * | 1/1991 | Usui | B01J 35/04 422/180 |
| 5,026,611 | A * | 6/1991 | Usui | B01D 53/86 228/258 |
| 5,104,627 | A * | 4/1992 | Usui | B01J 35/04 422/171 |
| 5,110,561 | A * | 5/1992 | Hitachi | B01D 53/9454 422/180 |
| 5,113,653 | A * | 5/1992 | Usui | B01D 53/9454 422/171 |
| 5,153,167 | A * | 10/1992 | Saito | B01J 35/04 502/439 |
| 5,194,414 | A | 3/1993 | Kuma | |
| 5,198,403 | A | 3/1993 | Brand et al. | |
| 5,336,472 | A * | 8/1994 | Toyoda | B01J 35/04 422/177 |
| 5,374,402 | A * | 12/1994 | Hitachi | B01J 35/04 422/177 |
| 5,431,886 | A * | 7/1995 | Rolf | B01J 35/0033 219/544 |
| 5,441,706 | A * | 8/1995 | Whittenberger | B01J 35/0033 422/174 |
| 5,464,679 | A * | 11/1995 | Maus | B01J 35/04 428/116 |
| 5,554,342 | A * | 9/1996 | Hirayama | B01J 35/0033 422/174 |
| 5,628,925 | A * | 5/1997 | Domesle | B01J 35/04 219/121.64 |
| 5,785,931 | A * | 7/1998 | Maus | B01J 35/04 422/180 |
| 5,846,495 | A * | 12/1998 | Whittenberger | B01J 35/04 422/180 |
| 5,853,902 | A * | 12/1998 | Usui | B01J 35/04 428/593 |
| 6,602,477 | B2 * | 8/2003 | Sakamoto | B01J 35/04 422/177 |
| 6,841,135 | B2 * | 1/2005 | Matsuoka | B01J 35/04 422/180 |
| 7,011,893 | B2 * | 3/2006 | Hodgson | B01J 35/04 29/890 |
| 7,030,059 | B2 * | 4/2006 | Tanabe | B01J 35/04 422/180 |
| 7,550,117 | B2 * | 6/2009 | Alward | B01D 39/2082 422/177 |
| 7,655,064 | B2 * | 2/2010 | Kato | B01D 53/9431 123/518 |
| 7,709,076 | B2 * | 5/2010 | Maus | B01J 35/04 428/116 |
| 7,785,544 | B2 * | 8/2010 | Alward | B01D 39/2082 422/179 |
| 8,337,762 | B2 * | 12/2012 | Vakkilainen | B01D 53/865 29/890 |
| 8,671,693 | B2 * | 3/2014 | Straza | B29D 99/0089 60/770 |
| 9,120,084 | B2 * | 9/2015 | Kimura | B01D 53/945 |
| 2002/0170941 | A1 * | 11/2002 | Wallach | B21F 27/128 228/170 |
| 2004/0180783 | A1 | 9/2004 | Nojima et al. | |
| 2007/0122330 | A1 | 5/2007 | Noh | |
| 2017/0175609 | A1 * | 6/2017 | Masoudi | F01N 3/2842 |

OTHER PUBLICATIONS

Written Opinion of the International Searching Authority for International Application No. PCT/EP2016/075722 dated Jan. 5, 2017.
Search Opinion dated Jun. 3, 2019 for Danish Patent Application No. PA 2015 00661 (6 pages).

* cited by examiner

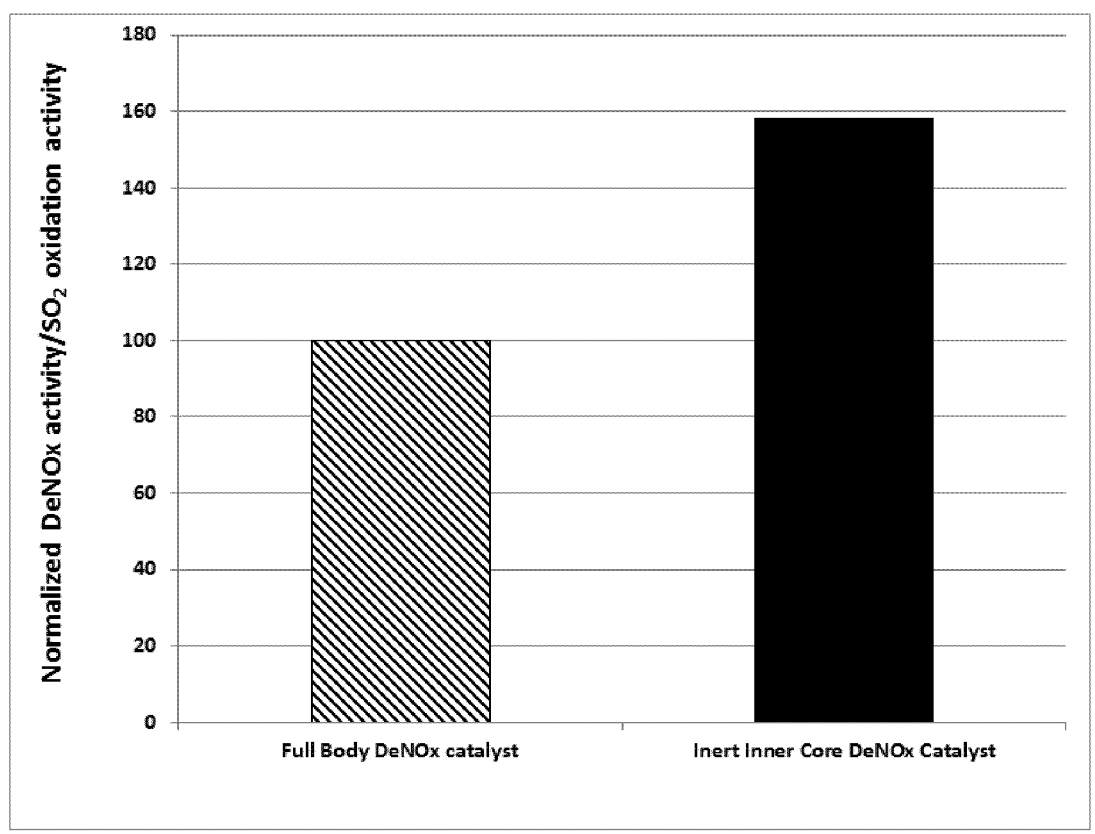

HONEYCOMB CATALYST FOR REMOVAL OF NITROGEN OXIDES IN FLUE AND EXHAUST GASSES AND METHOD OF PREPARATION THEREOF

The invention relates to removal of nitrogen oxides, NOx, from exhaust gases and flue gases from stationary flue gas sources including gas turbines and power plants.

The invention is in particular directed to a honeycomb shaped selective catalytic reduction (SCR) catalyst for use in the removal of nitrogen oxides in the flue gas formed in stationary sources in the combustion of fossil fuel like natural gas, coal or oil.

Methods for removing nitrogen oxides from stationary sources by means of the SCR process are well-known in the art.

In the SCR process, the content of NOx in the flue gas can be removed or substantially reduced by conversion to free nitrogen with a reducing agent typically ammonia in the presence of a catalyst by the following reactions:

$$4NO + 4NH_3 + O_2 \rightarrow 4N_2 + 6H_2O$$

$$NO + NO_2 + 2NH_3 \rightarrow 2N_2 + 3H_2O$$

The most typical SCR catalyst composition employed in flue gas cleaning from stationary sources is based on vanadium oxide.

Vanadium based SCR catalysts are in particular preferred where there is a risk of exposure to high sulfur fuel to avoid high sulfate emissions. The advantage of vanadium based SCR catalyst is that these catalysts have a relatively low sulfur oxidation activity, which is particularly important when employed in the cleaning of sulfur oxide containing flue gas.

The catalytically active components of vanadium based SCR catalysts consist of vanadium pentoxide and tungsten trioxide supported on titania. For use in gas cleaning from stationary sources, the catalyst is washcoated on a monolithic substrate, typically consisting of stacked up corrugated sheets of ceramic material or non-woven glass fibers forming a honeycomb structure with a plurality of parallel flow through channels.

Even having a low sulfur oxidation activity, vanadium-based catalysts in fact oxidise $SO_2$ to $SO_3$. $SO_3$ can react with $NH_3$ to from ammonium bisulfate, which may cause fouling and plugging of the catalyst and downstream equipment.

It is well known that the SCR reaction is much faster than the NO and NH3 diffusion into the catalyst wall at typical SCR reaction conditions. The NO removal is mainly dependent on the specific surface area of the monolith. This means that reducing the wall thickness of the monolith does not negatively affect the activity of the monolith to a great extent. Theoretically, from an activity standpoint a SCR catalyst having a wall thickness of only 20% of that of the commercial SCR monoliths would have the same activity at the typical high dust conditions. Such a catalyst would however suffer from erosion and mechanical instability.

On the other hand, the $SO_2$ oxidation reaction is much slower than the diffusion of $SO_2$ in the catalyst wall. This means that the entire catalyst wall contributes to the oxidation of $SO_2$ to $SO_3$. When vanadia is the active site for this undesired reaction, it is common to reduce the amount of vanadia loaded on the catalyst for minimizing the unwanted reduction. This has, however, the effect of reducing to a lesser extent the SCR reaction rate as well.

An alternative and more effective way of reducing the conversion of $SO_2$ to $SO_3$ can be to reduce the thickness of the catalyst wall. However, when reducing the wall thickness, the reduced wall thickness must still retain sufficient stability of the honeycomb structure. The problem is solved by the present invention, when providing the walls of the substrate with an inner core layer of inert clay materials.

Thus, this invention provides a honeycomb SCR catalyst composed of a plurality of corrugated sheets stacked upon one another to form a plurality of flow through channels, each corrugated sheet comprising an inner core layer comprising entangled non-woven fibers coated with a clay material on both sides of each of the corrugated sheets, and an outermost layer supported on both side of the inner core layer, the outermost layer comprising an SCR catalyst composition, the inner core layer makes up between 50% and 95% of the channel walls thickness.

The catalyst according to the invention has the advantage that it shows at least as good structure stability as conventional monoliths since the overall thickness of the monolith wall is preserved due to the inner clay core layer.

The present invention reduces the catalyst load per unit volume of monolith leading to a reduced $SO_2$ oxidation. At the same time, the reduced absolute amount of catalyst allows to increase the vanadia content in the outer layer and therefore maximizing the NO reduction activity of the catalytically outermost layer.

A further advantage is that outer layer on the inner core provides mechanical stability to the catalyst structure and low $SO_2$ oxidation at the same time. The outer layer prevents additionally drying cracks in the surface. This may also improve the erosion wear resistance and mechanical stability of the structure in that the points of attrition where particles impact the structure at a high impaction angle are removed.

Specific features of the catalyst according to the invention are alone or in combination thereof that the non-woven fibers are glass fibers;

the inner core layer further comprises diatomaceous earth;

the inner core layers have a layer thickness of between 0.6 mm and 1.2 mm;

the outermost layers have a layer thickness of between 0.05 mm and 0.6 mm;

the SCR catalyst composition comprises titania and vanadium pentoxide;

the SCR catalyst composition comprises titania, vanadium pentoxide and an oxide of tungsten;

the amount of vanadium pentoxide in the outermost layer is between 1 and 5% per weight;

the SCR catalyst further comprises a liner arranged on each of the corrugated sheets.

A further aspect of the present invention is a method of preparing a honeycomb SCR catalyst with a plurality of flow through channels comprising the steps of (a) providing sheets of entangled non-woven fibers;

(b) corrugating the sheets;

(c) stacking the corrugated sheets obtained in step (b) to form a honeycomb structured substrate;

(d) coating the corrugated sheets of the honeycomb structured substrate with a clay material to obtain an inner core layer in each of the corrugated sheets and drying and/or calcining the honeycomb structured substrate;

(e) coating each side of the inner core layer of each of the corrugated sheets in the honeycomb structured substrate with a catalyst coat layer comprising an SCR catalyst composition or a precursor thereof; and (f) calcining the coated honeycomb structured substrate of step (e) to obtain the honeycomb SCR catalyst.

Specific features of the method according to the invention are alone or in combination thereof that each corrugated sheet obtained in step (b) is lined with a liner prior to stacking;
the non-woven fibers are glass fibers;
the inner core material further comprises diatomaceous earth;
the catalyst coat layer has a layer thickness of between 0.05 mm and 0.3 mm;
the inner core layer has a layer thickness of between 0.6 mm and 1.2 mm;
the SCR catalyst composition comprises titania and an oxide of vanadium;
the oxide of vanadium is vanadium pentoxide applied in an amount of between 1 and 5% per weight in the outermost layer; and
the SCR catalyst composition further comprises an oxide of tungsten;

In all features and aspects the clay material can be selected from the kaolin group, hydrous alumina silicates, the chlorite group, the pyrophillite group, bentonite or mixtures thereof.

EXAMPLES

FIG. 1 shows the ratio of the DeNOx activity to the activity for $SO_2$ oxidation of a honeycomb SCR catalyst according to the invention with an inner core layer thickness of 0.7 mm and a catalyst outer layer thickness of 0.15 mm on each side of the core layer compared to the known honeycomb SCR catalyst with a full catalyst layer supported on corrugated glassfiber paper. Both ratios have been normalized to the value of the full catalyst layer. The ideal is to have as high a ratio of DeNOx activity to $SO_2$ oxidation activity.

As apparent from FIG. 1, the inert inner core catalyst according to the invention is about 58% higher/better in terms of DeNOx: $SO_2$ oxidation activity, compared to the full catalyst layer.

The invention claimed is:

1. A honeycomb SCR catalyst composed of a plurality of corrugated sheets stacked upon one another to form a plurality of flow-through channels,
wherein each corrugated sheet comprises an inner core layer comprising entangled non-woven fibers coated with a clay material on both sides of each of the corrugated sheets, and an outermost layer supported on both sides of the inner core layer, the outermost layer comprising an SCR catalyst composition, the inner core layer makes up between 50% and 95% of the channel walls thickness.

2. The honeycomb catalyst of claim 1, wherein the non-woven fibers are glass fibers.

3. The honeycomb catalyst of claim 2, wherein the inner core layer further comprises diatomaceous earth.

4. The honeycomb catalyst of claim 1, wherein the inner core layer comprises diatomaceous earth.

5. The honeycomb catalyst of claim 1, wherein each outermost layer has a layer thickness of between 0.05 mm and 0.6 mm.

6. The honeycomb catalyst of claim 1, wherein the inner core layer has a layer thickness of between 0.6 mm and 1.2 mm.

7. The honeycomb catalyst of claim 1, wherein the SCR catalyst composition comprises titania and an oxide of vanadium.

8. The honeycomb catalyst of claim 7, wherein the oxide of vanadium is vanadium pentoxide in an amount of between 1 and 5% by weight.

9. The honeycomb catalyst of claim 7, further comprising an oxide of tungsten.

10. The honeycomb catalyst of claim 1 further comprising a liner arranged on each of the corrugated sheets.

11. A method of preparing a honeycomb SCR catalyst with a plurality of flow-through channels comprising the steps of:
(a) providing sheets of entangled non-woven fibers;
(b) corrugating the sheets;
(c) stacking the corrugated sheets obtained in step (b) to form a honeycomb structure substrate;
(d) coating the corrugated sheets of the honeycomb structured substrate with a clay material to obtain an inner core layer in each of the corrugated sheets and drying and/or calcining the honeycomb structured substrate such that the inner core layer makes up between 50% and 95% of the channel walls thickness;
(e) coating each side of the inner core layer of each of the corrugated sheets in the honeycomb structured substrate with a catalyst coat layer comprising an SCR catalyst composition or a precursor thereof; and
(f) calcining the honeycomb structured substrate of step (e) to obtain the honeycomb SCR catalyst.

12. The method of claim 11, wherein each corrugated sheet obtained in step (b) is lined with a liner prior to stacking.

13. The method of claim 11, wherein the liner is coated with a clay material.

14. The method of claim 11, wherein the non-woven fibers are glass fibers.

15. The method of claim 11, wherein the clay material further comprises diatomaceous earth.

16. The method of claim 11, wherein the catalyst coat layer has a layer thickness of between 0.05 mm and 0.6 mm.

17. The method of claim 11, wherein the inner core layer has a layer thickness of between 0.6 mm and 1.2 mm.

18. The method of claim 11, wherein the SCR catalyst composition comprises titania and an oxide of vanadium.

19. The method of claim 18, wherein the oxide of vanadium is vanadium pentoxide applied in an amount of between 1 and 5% by weight.

20. The method of claim 18, wherein the SCR catalyst composition further comprises an oxide of tungsten.

21. A method of preparing the honeycomb SCR catalyst of claim 1, the method comprising the steps of:
(a) providing the sheets of entangled non-woven fibers;
(b) corrugating the sheets;
(c) stacking the corrugated sheets obtained in step (b) to form the honeycomb structure substrate;
(d) coating the corrugated sheets of the honeycomb structured substrate with the clay material to obtain the inner core layer in each of the corrugated sheets and drying and/or calcining the honeycomb structured substrate;
(e) coating each side of the inner core layer of each of the corrugated sheets in the honeycomb structured substrate with the catalyst coat layer comprising the SCR catalyst composition or a precursor thereof; and
(f) calcining the honeycomb structured substrate of step (e) to obtain the honeycomb SCR catalyst.

* * * * *